June 12, 1951     F. A. HARRAH     2,556,617
AIRCRAFT HANGAR
Filed Sept. 9, 1947     3 Sheets-Sheet 2
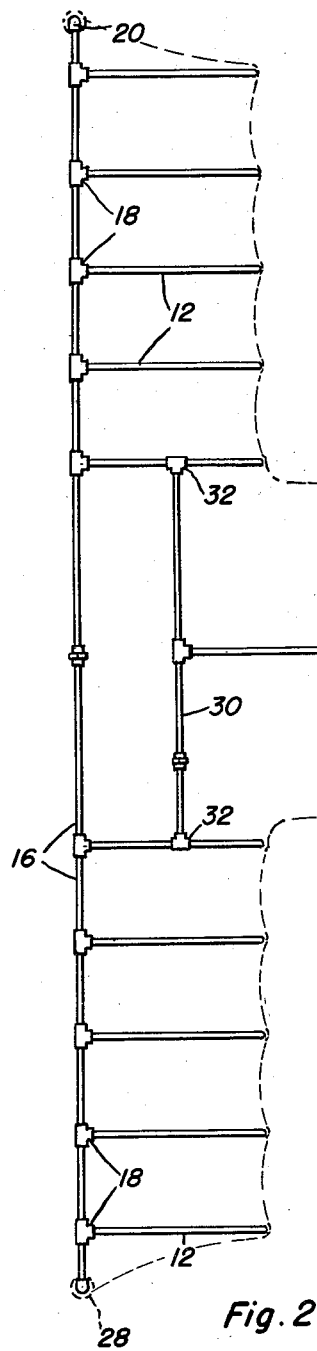
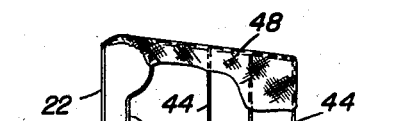
Fig. 3.
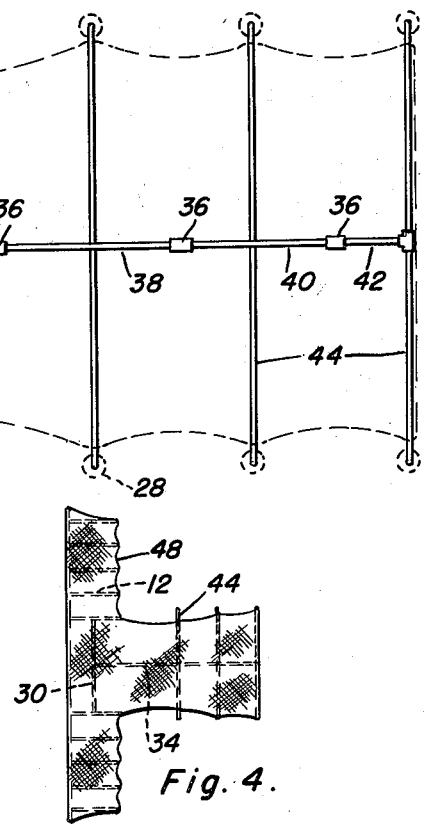
Fig. 4.
Fig. 2.
Inventor
Forrest A. Harrah
By Clarence A. O'Brien
and Harvey B. Jacobson
Attorneys

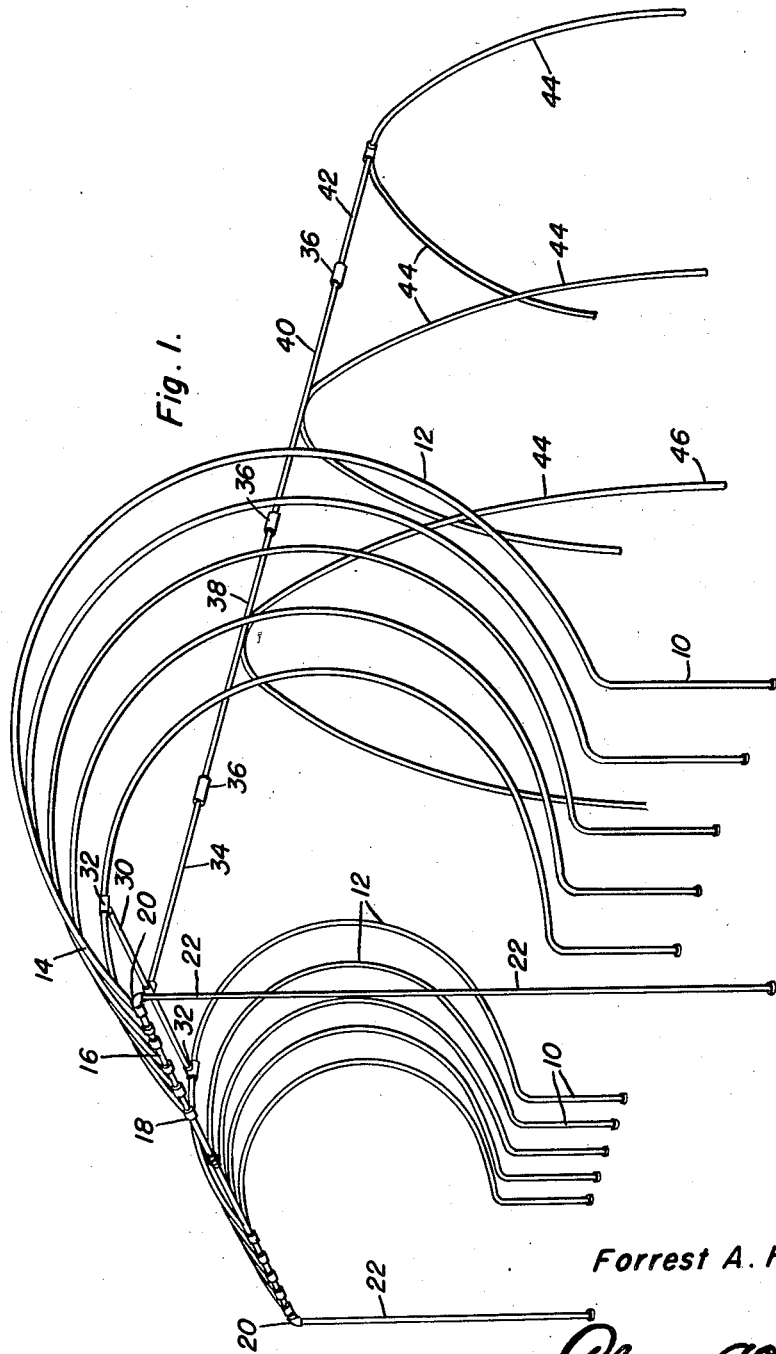

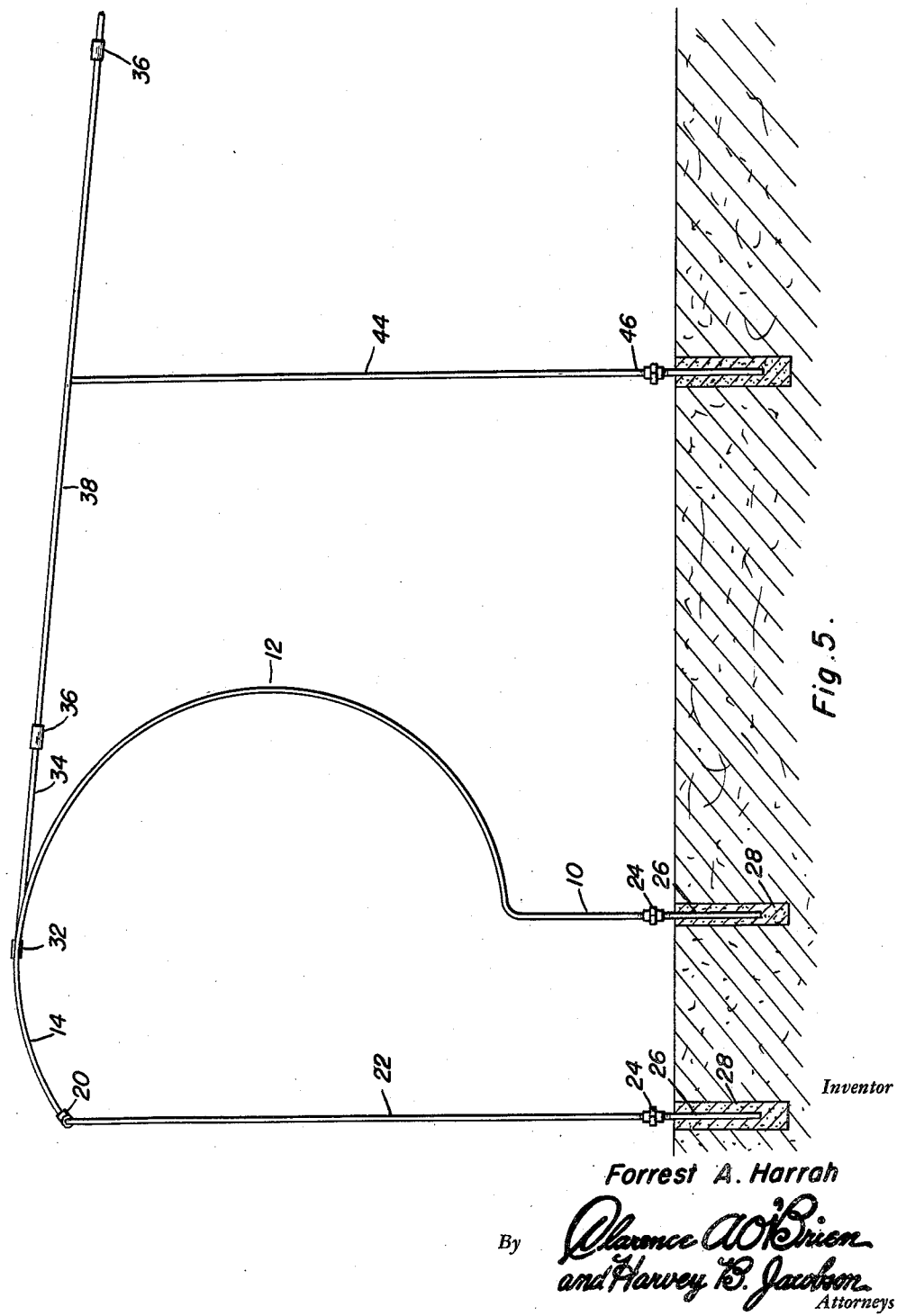

Patented June 12, 1951

2,556,617

UNITED STATES PATENT OFFICE 2,556,617

AIRCRAFT HANGAR

Forrest A. Harrah, Pendleton, Oreg.

Application September 9, 1947, Serial No. 772,985

3 Claims. (Cl. 135—3)

This invention relates generally to aircraft hangers, and more particularly to a portable aircraft hanger comprised of a framework constructed of cylindrical stock and covered with a tarpaulin, sheet metal, wooden, or other covering.

A primary object of this invention is to provide a portable aircraft hangar which is extremely light in weight and very rigidly constructed, and in which the ribs used to support the tarpaulin covering the wings of the airplane are arcuate at the upper end thereof and the forward upper end of each rib is bent downwardly so that when the tarpaulin is fastened to these ribs it is disposed so as to decrease the likelihood of the same being detached from the ribs by the wind, as will be hereinafter described more fully.

Another salient object of this invention is to provide a hangar which is easily secured firmly to the ground, the ease of which the hangar can be anchored in the ground, together with the aforementioned configuration minimizing the tendency for the hangar to be displaced by wind, constituting advantages not enjoyed by other portable hangars.

Still another object of this invention is to provide a hangar which may be constructed from parts which are each small in dimension and weight, and which may be transported to the site of the proposed hangar, whereafter these parts may be properly assembled, all with utmost convenience.

And a last object to be specifically mentioned is to provide a device of this character which is relatively inexpensive and practicable to manufacture, which is extremely simple and convenient to use, and which will give generally efficient and durable service.

With these objects definitely in view, this invention resides in certain novel features of construction, combination and arrangement of parts and portions as will be hereinafter described in the specification, particularly pointed out in the appended claims, and illustrated in the accompanying drawings which form a material part of this application, and in which:

Figure 1 is a perspective view of the assembled framework of the hangar;

Figure 2 is a top plan view of the hangar, with the tarpaulin cover therefor indicated in dash lines, and the concrete blocks imbedded in the ground and used for securement of the lower ends of the supporting members of the framework being shown in dotted lines;

Figure 3 is a side elevational view of the assembled hangar, the view being on a considerably reduced scale;

Figure 4 is a similar top plan view of the assembled hangar; and

Figure 5 is an enlarged end elevational view of the forward portion of the framework of the hangar, indicating how the lower ends of the supporting members in the framework are embedded in concrete blocks sunk into the ground.

Similar characters of reference designate similar or identical parts and portions throughout the specification and throughout the several views of the drawings.

Referring now to the drawings in detail, and having, first, particular reference to Figure 1, it will be noted that the framework of this hangar includes a plurality of similar horizontally spaced and aligned members each comprising a vertical standard portion 10 and an arcuate portion which is integral with the vertical standard portion 10, hereinafter referred to as the tarpaulin supporting ribs 12. It is an important feature of these ribs 12 that each rib is comprised of a semicircular portion disposed on one side of the vertical standard portion 10 and a forwardly extending and downwardly arcuate portion 14. The forward ends of the portions 14 are secured together by a horizontal member 16 which will be comprised of a plurality of sections. In the preferred form of this invention, the elements described immediately above are all constructed of tubular stock material and it is preferred that ordinary type couplings or T-joints 18 should be used to connect the portions 14 with the sections of the horizontal member 16.

A pair of elbow members 20 are used to connect the ends of the horizontal member 16 to vertical post members 22. The lower ends of the vertical standard portion 10 and the lower ends of the vertical posts 22 are threaded for connection, by means of couplings 24 to pipes or rods 26 anchored in concrete blocks or slabs 28 in the ground, as indicated in Figure 5.

The central pair of rib members 12 must be spaced apart sufficiently to allow the empennage and fuselage of the airplane to be used with the hangar to pass therebetween, and a horizontal cross member 30 is secured, approximately directly above the vertical standard portions 10, to this central pair of ribs, by means of T-couplings indicated at 32. An extending member 34 is secured centrally of this cross member 30 and extends normally and rearwardly therefrom. This member 34 is also sectional in character and simple couplings 36 are used to connect sections 38, 40 and 42 thereof to the foremost section. The drawings show a plurality of supporting members 44 of arcuate form either welded or otherwise secured to the sections 38, 40 and 42. These arcuate supporting members terminate in substantially vertical portions 46 which will preferably be threaded and secured by couplings, similar to the couplings 24 mentioned above to other rods or pipes similar to the rods or pipes 26 described above.

The covering for this hangar will ordinarily be of tarpaulin type and may be constructed in sections if desired. The exact nature of this tarpaulin 48 is not an important feature of this invention, except that such a tarpaulin should extend over the upper portions of the ribs 12, and extend rearwardly in stretched condition over the extending member 34 and the upper portions of the supporting members 44. The forward edge of the tarpaulin will be secured to the horizontal member 16 and a complement of securing devices will be used to securely tie the tarpaulin edges to the ribs and the other portions of the frame structure. The general shape of the tarpaulin is indicated in Figures 3 and 4, and it will be noted that the ends of the hangar are open.

The operation of this invention will be clearly understood from the foregoing description of the mechanical details thereof, taken in connection with the above recitation of the objects sought to be achieved by this invention. It will be obvious that the hangar may be easily transported from place to place, except as regards the anchoring means comprised of the rods or pipes 26 and the cement blocks 28 which may be discounted as the cost of the same is not great.

Though there has been shown a particular embodiment of this invention, minor variations in details of construction may be resorted to without departure from the spirit and scope of this invention and it is desired to limit this invention only in accord with a proper interpretation of the terminology of the appended claims.

Having described the invention, what is claimed as new is:

1. A portable aircraft hangar framework including a plurality of horizontally spaced and aligned members each comprising a vertical standard terminating at the upper end thereof in an integral tarpaulin supporting rib comprising a semi-circular portion disposed above and to one side of said standard, and a downwardly arcuate portion extending from the upper end of the semi-circular portion and co-planar therewith, a horizontal member connecting the upper ends of said ribs together, vertical posts connected to the ends of said horizontal member, a cross member connecting a centrally disposed pair of said ribs, an extending member normal to said cross member, and supporting members spaced along said extending member.

2. A portable aircraft hangar including a plurality of horizontally spaced and aligned members each comprising a vertical standard terminating at the upper end thereof in an integral tarpaulin supporting rib comprising a semi-circular portion disposed above and to one side of said standard, and a downwardly arcuate portion extending from the upper end of the semi-circular portion and co-planar therewith, a horizontal member connecting the upper ends of said ribs together, vertical posts connected to the ends of said horizontal member, a cross member connecting a centrally disposed pair of said ribs, an extending member normal to said cross member, supporting members spaced along said extending member, all said members being of cylindrical character, and detachable means for securing said vertical standards, said vertical posts and said supporting members to the ground, and a tarpaulin covering said ribs and stretched over said extending member and said supporting members.

3. A hangar according to claim 2 and in which said means comprises a plurality of threaded unions mounted in a sill embedded in the ground.

FORREST A. HARRAH.

REFERENCES CITED

The following references are of record in the file of this patent:

UNITED STATES PATENTS

| Number | Name | Date |
|---|---|---|
| D. 138,447 | Van Scoy et al. | Aug. 8, 1944 |
| D. 139,082 | Larkin | Oct. 10, 1944 |
| D. 149,505 | Maggi | May 4, 1948 |
| 1,350,289 | Richards | Aug. 17, 1920 |
| 2,022,211 | Leffert | Nov. 26, 1935 |

FOREIGN PATENTS

| Number | Country | Date |
|---|---|---|
| 491,690 | Germany | Feb. 13, 1930 |